UNITED STATES PATENT OFFICE.

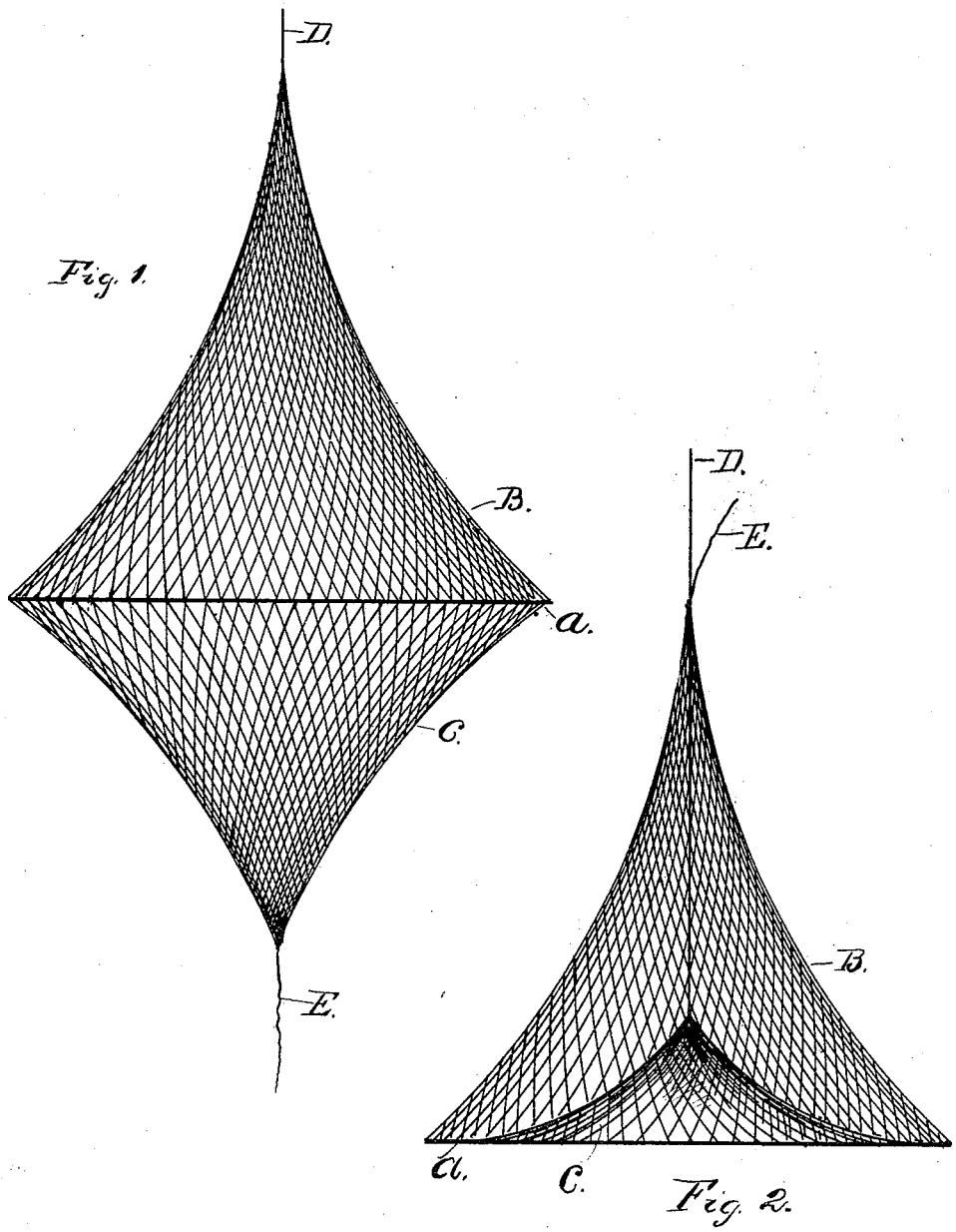

HENRY E. FREYSCHLAG, OF SAN JOSÉ, CALIFORNIA.

FISHING-NET.

SPECIFICATION forming part of Letters Patent No. 405,957, dated June 25, 1889.

Application filed February 21, 1888. Serial No. 264,859. (No model.)

*To all whom it may concern:*

Be it known that I, HENRY EMILIUS FREYSCHLAG, a citizen of the United States, residing at San José, in the county of Santa Clara and State of California, have invented and produced a new and original Design and Combination in Fishing-Nets, of which the following is a specification, reference being had to the accompanying drawings, forming part thereof.

The object of this invention is to provide a better and more convenient method of securing fish in quantity from any and all waters.

Figure 1 represents a side elevation of my net, showing form and position of base-hoop. Fig. 2 is a sectional view of same with lower (or inner) net drawn within the outer (or upper) net as used in fishing, these two views being necessary to fully illustrate my design.

Nets of this character are embraced within the class generally known as "throw" or "casting" nets, can only be used successfully in small diameter, and when thrown with force sufficient to expand them ere they reach the surface of the water cause such noise and commotion as to startle and scatter the fish they seek to secure. In my design all this is avoided. Nets can be made of several sizes and grades to secure any and all fish taken by hook or nets. This net, being suspended by its apex, the hoop being down, is lowered into the water without noise or agitation, and settling to the bottom quietly secures all fish within its area. As the base ring (or hoop) reaches the bottom, it forms a barrier, and as the inner net settles it startles the fish to escape, which pass through its meshes and are secured, the smaller mesh of the outer net being suspended offering a much greater resistance to their efforts. When ready to withdraw the net from the bottom, the inner net is drawn well within the outer net, which relieves the tension upon the same, it falling into a loose bag-like form around the base-ring, in which the larger share of the catch will be found, which are easily removed through the larger meshes of the lower net.

This net can be used in small size for brook and creek fishing, being lowered from the hand or at the end of a pole, or of larger size for lake, bay, or sea fishing, securing with equal certainty any and all sizes of fish taken by hook or in nets or seines.

During the past six months this form of net in various sizes has been tried in creek, river, and bay fishing with the greatest success, fish in large numbers being secured when none could be taken with the hook.

The leading features of my design consist of a cone-shaped net B, suspended and manipulated from its center and apex by the cord D with the circular base, to which is attached a light metallic ring (or hoop) A, the same being of a circumference corresponding to the base of the net which it expands. Upon this base-ring A there is made or attached a second net of similar shape and form as net B, but of less height and larger mesh. This net is also supported from its apex and is manipulated by the cord E, which passes up inside and through the center of net B. These nets, when in use, are drawn one within the other, and their action controlled at will by the cords D and E, tension upon either of which serves to change the relationship of the nets to each other and enable the manipulator to fully control its action.

I claim—

1. A fishing-net composed of two cones, the bases of which are united to a ring which serves as a weight and as an extender for the said bases, substantially as described.

2. The combination of inner net C, of similar shape and form with outer net B, and metallic base-ring A, the same working within and upon net B, being controlled by the cord E, attached to its center and apex and passing up inside and through center of net B.

HENRY E. FREYSCHLAG.

Witnesses:
    GEO. S. FIFE,
    J. H. RUSSELL.